Figure 9:
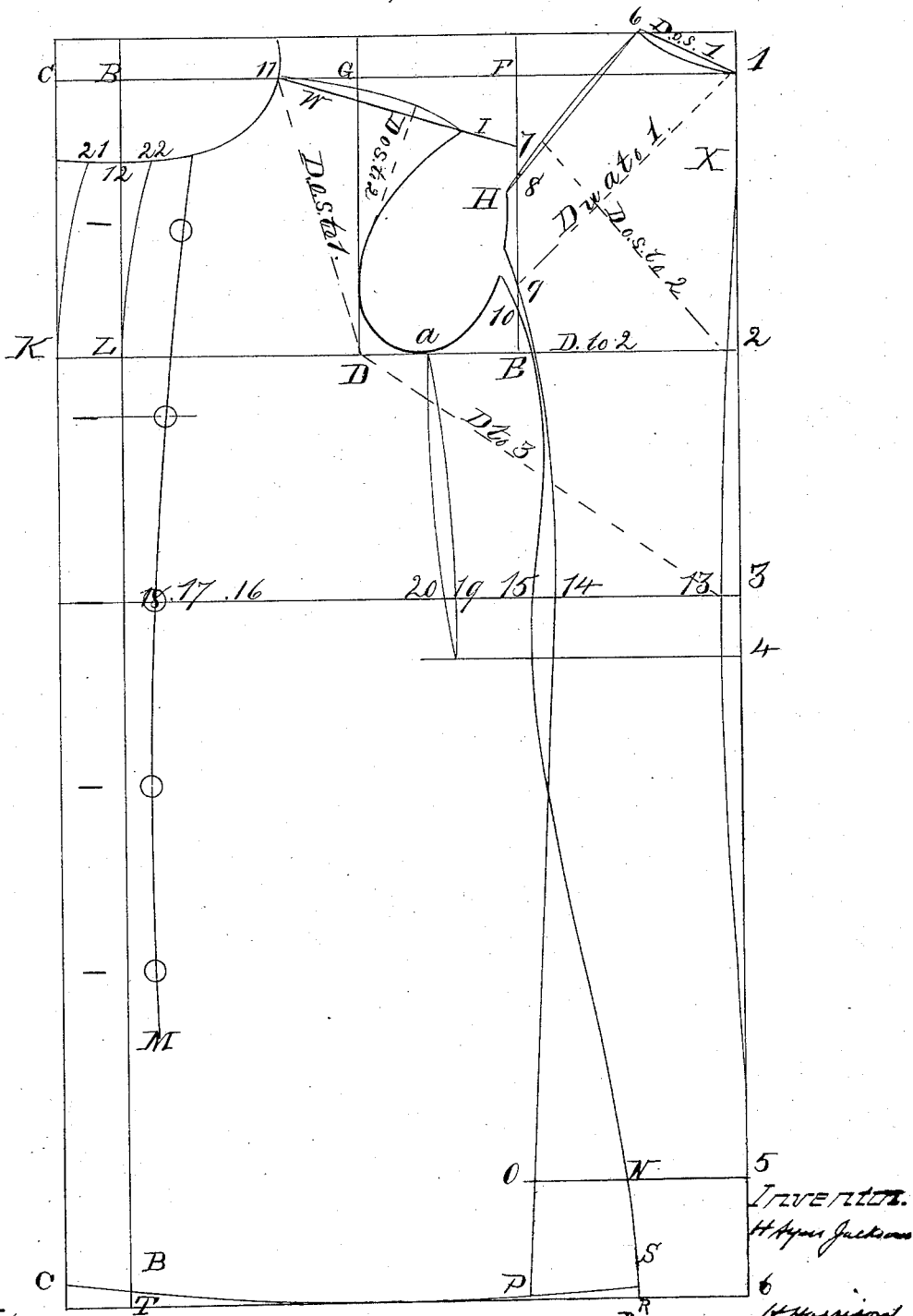

(No Model.) 5 Sheets—Sheet 1.
H. A. JACKSON.
SYSTEM OF MEASURING FOR GARMENTS.
No. 327,172. Patented Sept. 29, 1885.
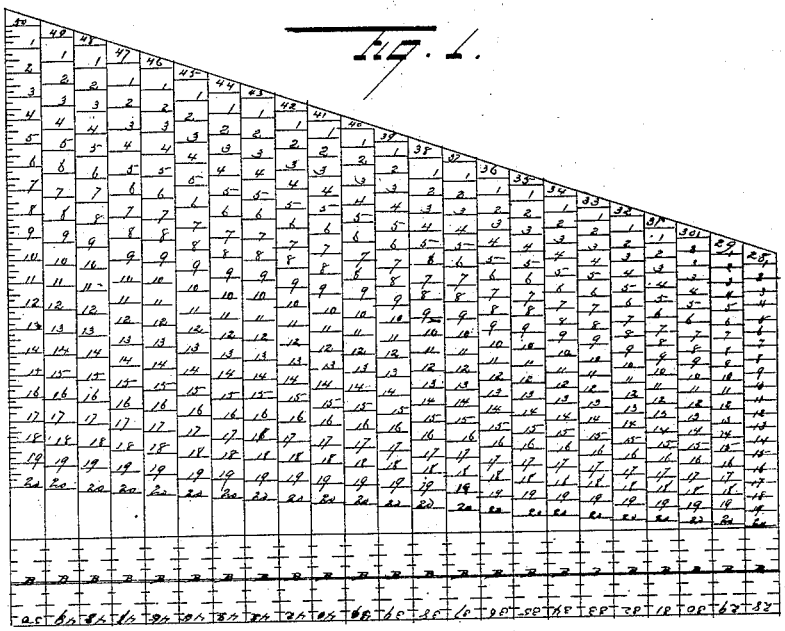
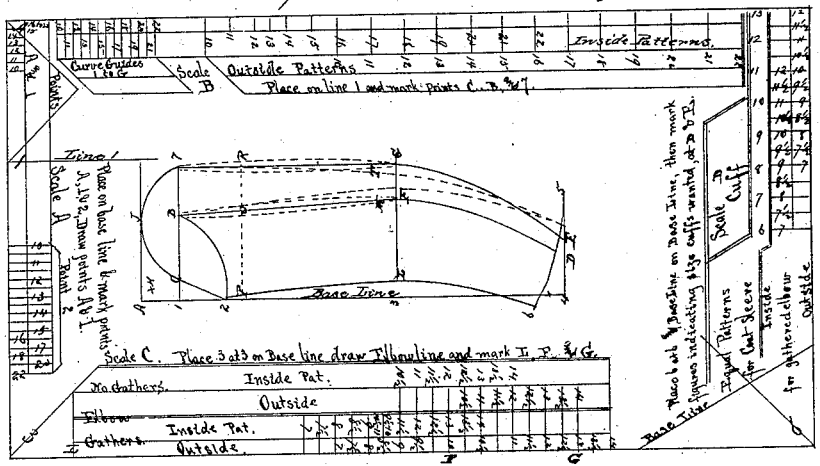
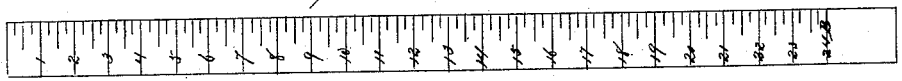
Witnesses:
H. C. McArthur
Chas. H. Carman
Inventor:
H. Ayers Jackson
per
H. Harrison
Attorney.

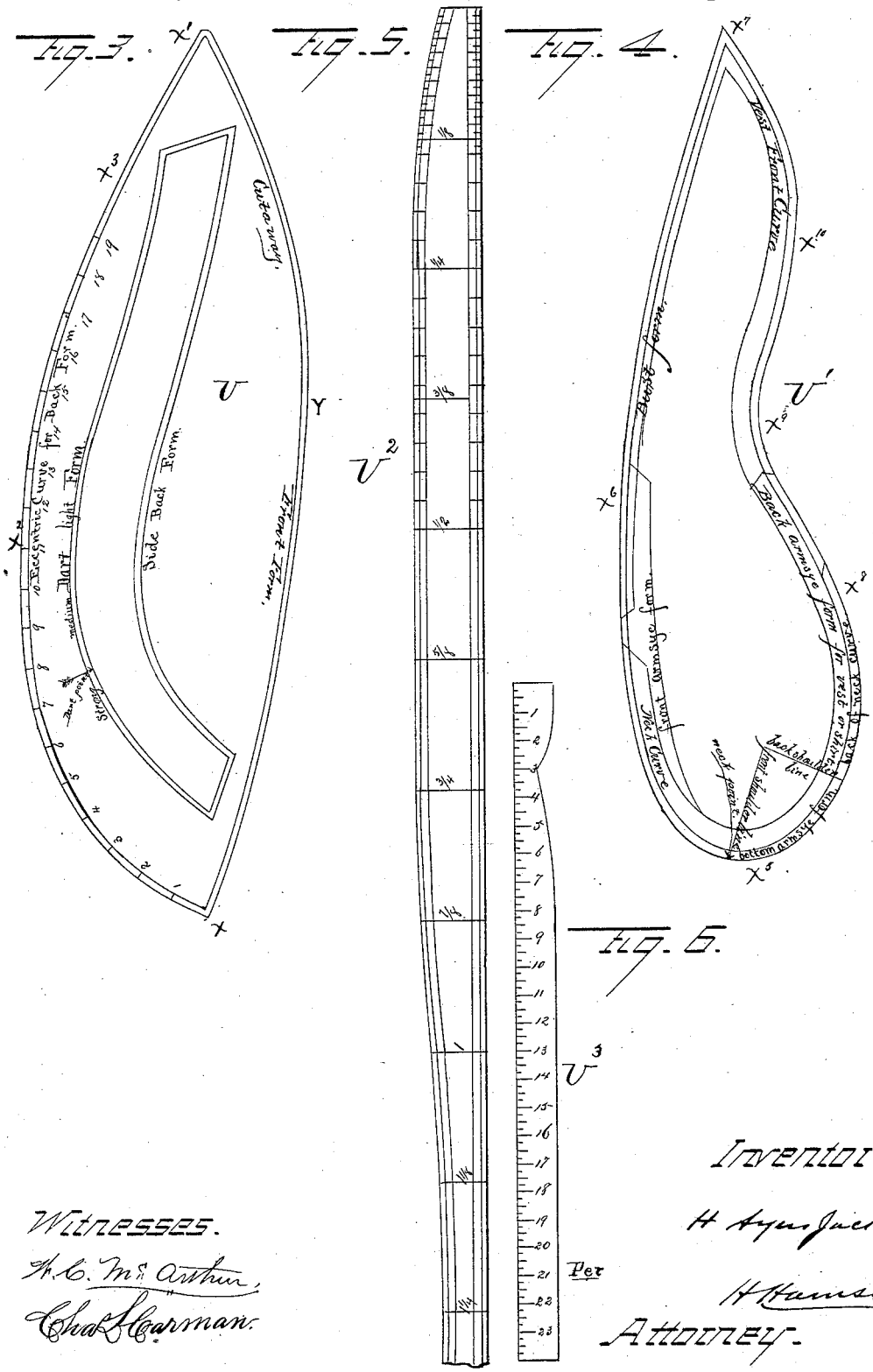

(No Model.) 5 Sheets—Sheet 3.
H. A. JACKSON.
SYSTEM OF MEASURING FOR GARMENTS.
No. 327,172. Patented Sept. 29, 1885.
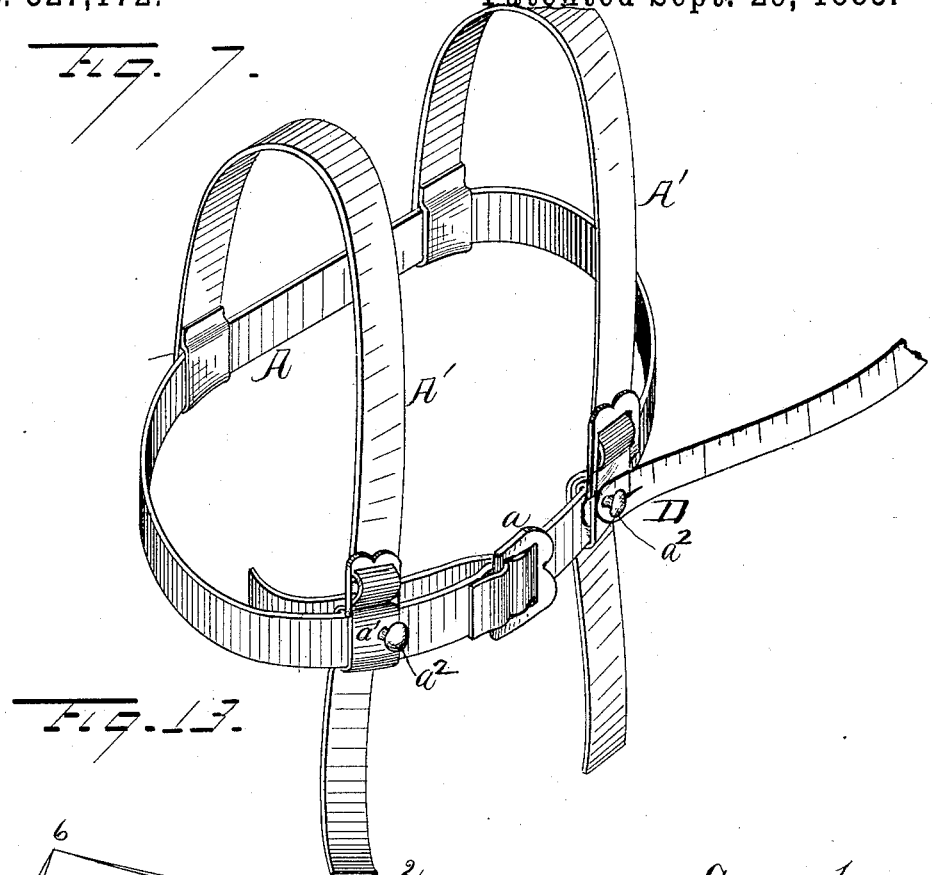
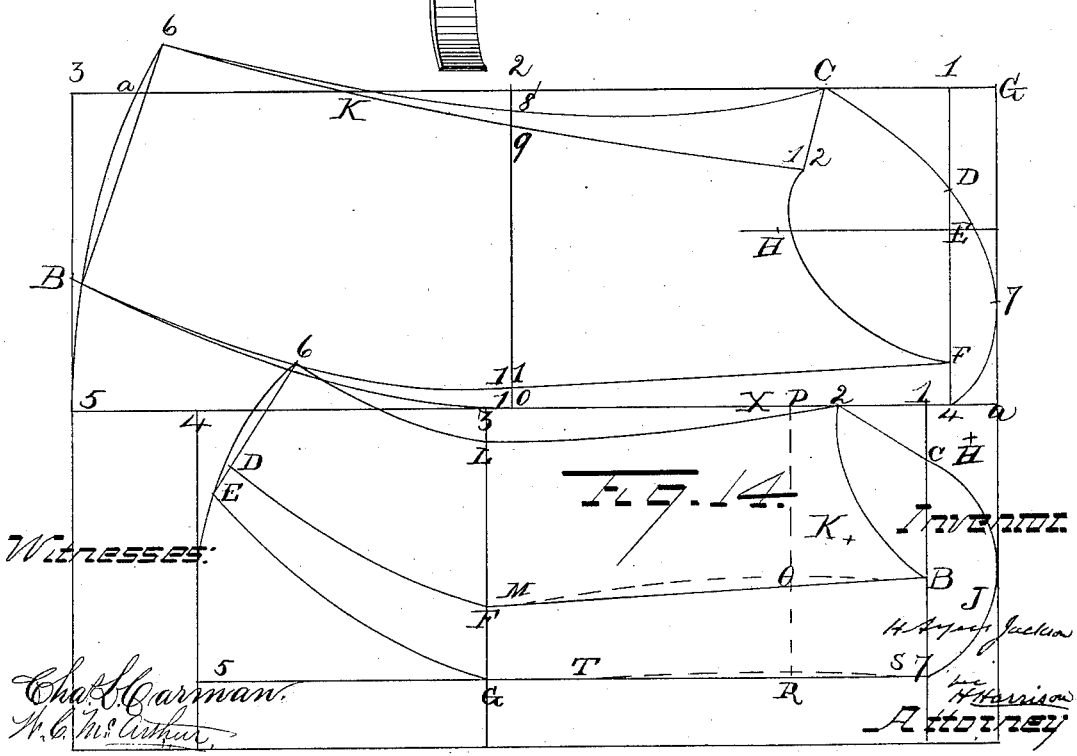

(No Model.)  H. A. JACKSON.  5 Sheets—Sheet 4.

SYSTEM OF MEASURING FOR GARMENTS.

No. 327,172.  Patented Sept. 29, 1885.

(No Model.) 5 Sheets—Sheet 5.
H. A. JACKSON.
SYSTEM OF MEASURING FOR GARMENTS.
No. 327,172. Patented Sept. 29, 1885.
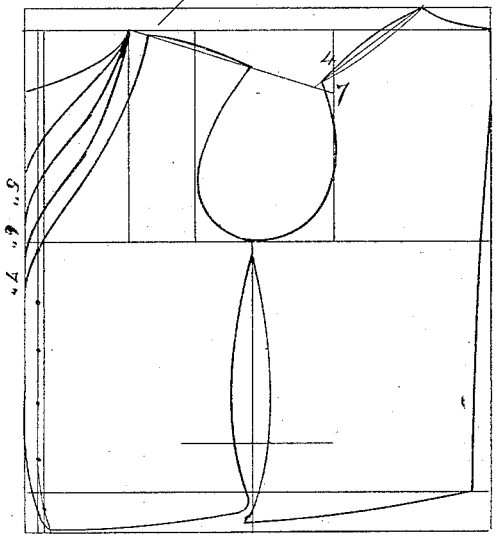
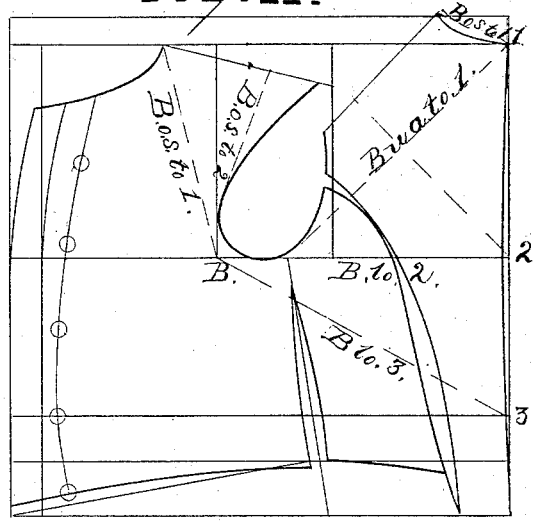
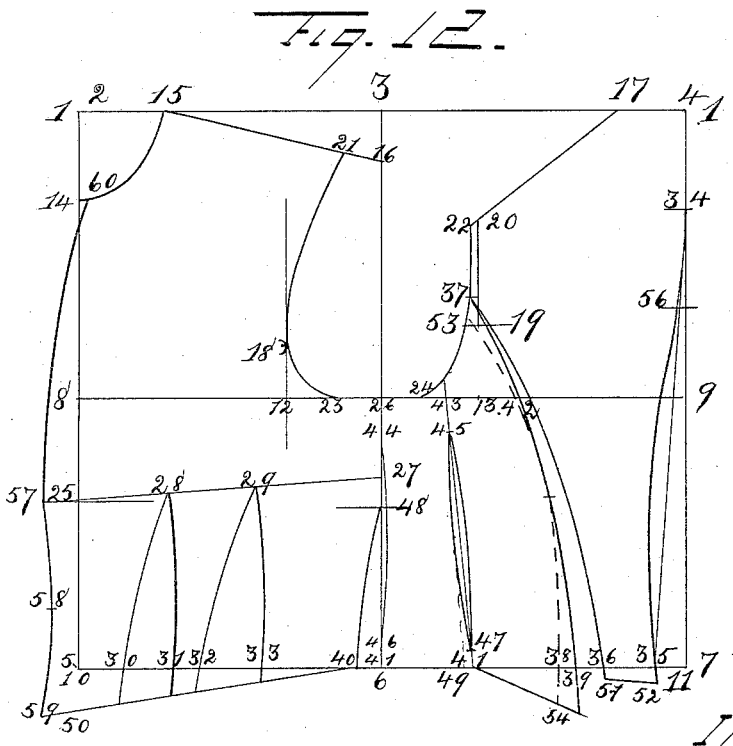

UNITED STATES PATENT OFFICE.

H. AYERS JACKSON, OF CHICAGO, ILLINOIS.

SYSTEM OF MEASURING FOR GARMENTS.

SPECIFICATION forming part of Letters Patent No. 327,172, dated September 29, 1885.

Application filed May 22, 1883. (No model.)

*To all whom it may concern:*

Be it known that I, H. AYERS JACKSON, a citizen of the United States, residing at Chicago, in the county of Cook and State of Illinois, have invented certain new and useful Improvements in Systems of Measuring, of which the following is a specification, to wit:

This invention relates to an improved method of measuring, drafting, and cutting clothing, whereby a more perfect fit is obtained and a great saving made in the quantity of goods used; and in order to carry out my method I use as a means a harness adapted, when properly adjusted, to determine in all cases a positive point from which the majority of the most important measurements are taken; a series of scales, each of which is exactly one-fourth the length of a particular bust-measure, and each of said scales being divided into twenty-four equal parts or divisions, with the addition of about one inch, for allowance for seams, and one of which scales is applicable to the laying off of all measurements for a person of corresponding bust-measure; in a sleeve-scale, in which, by a mathematical calculation, inches and fractions of inches are so grouped that any desired size or style of sleeve may be accurately drafted and placed in accordance with the measure taken, whether it is desired to "full" or not to "full" at the elbow, or with either straight or curved sleeve, as desired; and also a series of sliding eccentric curves so arranged with reference to each other that each shall be distinguished from the other at a glance, and adapted to give the required curve to fit any ordinarily-shaped person, of whatever style or size is desired, substantially as will be hereinafter more fully set forth.

In order to enable others skilled in the art to which my invention appertains to make and use the same, I will now proceed to describe its construction and operation, referring to the annexed drawings, in which—

Figure 1 is a view of one set of my scales suitable for bust-measures for twenty-eight to fifty inches. Fig. 2 is the sleeve-scale. Figs. 3 and 4 are the eccentric-curve patterns. Fig. 5 is the form for drafting the center line of the back of a garment; Fig. 6, a hip-rule for ladies' use. Fig. 7 is the harness for measuring. Fig. 8 is a view of one of my scales in which the divisions have been carried out to twenty-four, (and about one inch added from point B.) Fig. 9 is a draft of a sack-overcoat drawn by my method. Fig. 10 is a vest. Fig. 11 is the waist or upper part of a frock-overcoat or surtout. Fig. 12 is a lady's garment. Fig. 13 is a gentleman's sleeve, and Fig. 14 a lady's or child's sleeve.

In the taking of measurements for cutting garments—such as coats, vests, ladies' dresses, cloaks, &c.—it is essential that a particular point should be established in each case from which all the measures in the upper part of the pattern should be taken, and this point for the perfect drafting of the pattern should be always in the same relative position in every case, no matter how much the sizes may vary; and in order to do this I provide a harness consisting of the belt A, provided with a buckle, $a$, by which it may be adjusted as desired. To this belt, by a loop upon the rear side, are secured two shoulder-straps, A', which slide upon the belt, and at their forward ends are buckled to a similar loop, $a'$, sliding upon the front of the belt. These loops $a'$ are each provided with a button or stud, $a^2$, to which the measuring-tape is attached, as seen at D. This belt is secured around the person to be fitted, just under the arms, with the straps A' passing over the shoulders. These straps are then adjusted by their buckle, or by slipping them along upon the belt until the latter is drawn up close beneath the armpits, and is perfectly level around the body, and its upper edge forms a line upon which many of the measurements are taken. When this belt or harness has been properly adjusted, the measurements are taken as follows: first, length of back; second, width of back; third, from the button on belt or point D to the center of belt at back of garment; fourth, from button or point D to center of back at waist; fifth, from button or point D under the arm to center of back at neck; sixth, from button or point D over shoulder to center of back at neck; seventh, from button or point D over shoulder to center of back at belt; eighth, around breast; ninth, around waist or hips.

The scale patented to me June 6, 1882, was based upon the bust or breast measure, each scale being just one-fourth of the bust-measure in length, said scales being graduated from a twenty-three-inch to a forty-eight-inch bust.

Each of these scales was divided into twenty-four equal spaces, only ten of which were laid off on one end of the scale. The forty-eight-inch bust-measure, therefore, was just twelve inches in length and subdivided into twenty-four equal spaces of one-half inch each, and the twenty-four-inch scale was six inches long, the twenty-four subdivisions being one-fourth inch long. The common difference between each scale being just one-fourth of an inch, the common difference between each subdivision was therefore one ninety-sixth part of an inch, as will be readily seen.

In the present scale the entire twenty-four divisions are marked upon the scale, as shown in Figs. 1 and 8, and each of these is again subdivided into four equal spaces, making ninety-six equal subdivisions in each scale, each of which is just one three-hundred-and-eighty-fourth part of the bust-measure, and the common difference between the divisions in each scale is therefore just one three-hundred-and-eighty-fourth of the bust-measure. To each scale is added one inch for convenience when cutting gentlemen's clothing. This scale is clearly shown by V in Figs. 1 and 8, the former of which shows the manner of printing or forming a complete set in one piece, and the latter shows one after being divided from the others, and having all its divisions and subdivisions marked upon it.

U, Fig. 3, shows the eccentric curves combined in one form for fitting and drawing the "back form," "side back," "front," and "darts" to fit any measurements, and U', Fig. 4, combines the curves for forming the "bust form," "neck curve," "front, back, and bottom armseye form," "back-neck curve," and "vest-front curve." U², Fig. 5, shows the form for drawing the back center line, and Fig. 6, U³, is a "ladies' hip-rule." These forms and curves are each marked, as shown, to indicate the particular position to which they are applicable, and when laid upon the pattern may be slid along until their edges pass through the points laid out, and the curve thus found will be the one required to properly fit the person measured. This also allows of getting any strength of curve that may be desired by simply slipping the forms one way or the other until the desired strength of curve is had.

In my method of drafting the distance between the bust-line (2 to 10, Fig. 12) and the back line (4 to 11) is the length of two scales, or just one-half of the bust or breast measure, which is the measure taken around the largest portion of the bust or breast. The distance between the top waist-line (1 to 1) and the under arm-line (8 to 9) is a geometrical calculation based upon the size of the armseye in connection with the shoulder-slope, &c. The distance between the under arm line or level and the bottom waist line or level (5 to 7) is the measured distance from the top of the hip-bone to the level of the lowest point of the muscle under the arm. It is evident, therefore, that in case the chest-measure (8 to 12) or width of back-measure (9 to 13) be taken too long or too short it will contract or expand the space occupied by the diameter of the armseye (12 to 13) in proportion as they may be too long or too short. The proof of all the measures bearing upon said armseye is therefore the measured circumference thereof when drafted, and if it shows on measurement the same number of inches required by the original measure of the person it is proof that no error has been made in either the measure or its proper application in the draft. The measures so proved are as follows: width of chest, width of back, geometrical measure from the top of shoulder at neck to the under-arm level, and the shoulder-measure. The placing of parallel lines or levels at the apparent top bone in the spinal column, at the intersection of the under part of arm with the trunk of body, and at the top of the hip-bones, and perpendicular lines at right angles thereto at the center of the bust, at the center of the shoulder, and at the center of the back, as shown clearly in Fig. 12, enables each of said lines to be used as a perfect base, from which the proper delineation of each or any portion of the pattern and the subsidiary lines thereof can be held under perfect control and be laid off by the scale or other measure, as may be desired, without the risk of errors in any portion of the pattern to be drawn. The entire pattern is thus held within and over its own proper rectangle, and each part or portion thereof lies contiguous to each other part in proper relation thereto, and each will thus prove the other.

In order to better illustrate the drafting of a pattern from measurements thus taken, I will take the sack-overcoat shown in Fig. 9, which is reduced from one drafted in full size from the following measures, viz: length of back from neck to top of belt or line under arms, nine inches; to waist, seventeen inches; to hips, nineteen inches; to opening in back at bottom, thirty-six inches; to bottom edge, forty inches; width of back, seven and one-eighth, nineteen and one-half, thirty-one and three-fourths; D (position of button in measuring) to center of back, twelve and one-fourth; D to center of back at waist, thirteen and one-half; D under arm to center of neck, fifteen and three-fourths; D over shoulder to center of neck, twelve and three-fourths; D over shoulder to back center of under-arm line or belt, seventeen and one-half; breast, thirty-six; hips or waist, thirty-five. To draft the pattern from these measurements, first draw the perpendicular back line, then from this draw two parallel lines one and one fourth inch apart across the top of the paper at right angles to the back line. Apply the back-measures as given above and mark the points 1, 2, 3, 4, 5, and 6 upon the back line, and draw a line at right angles to the back line at each one of these points, and the basis of the design will be delineated. Now, select the scale corresponding to the breast-measure of thirty-six inches, and as it is of just one-quarter the length of the full breast-measure, mark its length twice upon the lines squared out from the points 1 and 6, and connect the two points thus found by a vertical line, as seen at B in the figure, and a similar line two inches (more or less, according to fancy) therefrom, as seen at C, for the lap. Next mark the width of back, seven and one-eighth inches, on line 2 and mark point E and apply the measure or button at D to center of back twelve and one-fourth inches on same line, and mark at D and square up from D and E to top line of pattern at points marked G and F in the figure, the space between these lines indicating the thickness of the arm at shoulder. Now place division 8 of the scale on the top of back line and mark point 6 where its end intersects the upper horizontal line. Place 9 of scale at point F, and mark division 3 and end at points 7 and 8. Place division 5 at E and mark 1½ and end at 9 and 10. Place division 7 at G and mark end at 11 on the line B to 1. Place division 7 at B and mark end at 12 to find position of neck-line on line B. Place division 16 at point 3 and mark point 14 at end of scale. Draw lines from points 6 to 8 and 11 to 7 to form the shoulder. Form back armseye, H, to a, and front armseye, I, to a. Form side back seam 9 to 14. Form neck 11 to 12 and back of neck 6 to 1. Now apply the measure or button at D to center of back at waist, thirteen and one-half inches to the points or button at D to 3 on the diagram, and it will be found to have a surplus of one and one-eighth inch. This surplus is divided, and one-half or five-eighths inch is marked in from back line at 3 to point 13, and the remaining five-eighths inch is marked in from point 14 to 15. Now form the back from point x to 13 and 5, and side back 10 to 15. Then place the tape with one-half of the hip or waist measure at 3 and mark the end of the tape at 16, and extend one and one-fourth inch to point 17 for surplus removed from back. Measure in one inch, or as fancy may dictate, from line B for the button-line and mark at 18. Take out three-eighths inch from 19 to 20 and form lines a to 19 and a to 20. Now measure both out and in one inch at point 12 and mark points 21 and 22, and form these lines to K and L. Measure in from 22 one and one-half inch and form button-line to 18 and M. Place division 18 of scale at point 5 and mark 8, and end at N and O. Form 15 to N R and 14 to O P, as shown. Place 1½ of scale at R, it being at the intersection of the back of skirt-line with line 6, as shown by 15 to N. Then mark S, it being immediately above R. Place end of tape at S and measure to W on front shoulder; measure same distance to T on B line; form bottom of pattern to fancy from S to T and C. Apply the measures from button or point D over shoulder to points 1 and 2, and under arm to 1, and correct pattern, if necessary, before cutting.

In Fig. 11 is shown a body for a single-breasted surtout, and as this is measured and drafted in substantially the same manner no detailed directions for the same are here necessary.

In drafting a sleeve-pattern I use the scale V', (shown in Fig. 2), in which inches and fractions of inches are so grouped that any desired size of armseye, elbow, or cuff can be placed accurately in accordance with the measures taken, and a perfect pattern drafted for any desired style of sleeve, whether to "full" or not to "full" at the elbow, the common straight sleeve to those of more or less curve equally suitable for coats, cloaks, ladies' dresses, or for children's use. By reference to this scale it will be readily seen that it is composed of a number of graduated scales, suitable for marking the points of various portions of the pattern, as per measurements taken. For instance, the scale marked C shows the measurements at elbow, and if a measure of thirteen inches has been taken at this point the end of scale at 3 is placed at the base line, as on the diagram shown on the scale, and the point L marked for the inside edge of the pattern. From this point the two sides of the sleeve are to be measured, so that one will be larger than the other, but both together will give thirteen inches. By reference to the scale it will be seen to provide two sets of divisions, one for a gathered elbow and the other without gathers. In each of these divisions 13 is so arranged that the smaller and greater side of the scale taken together will just give these dimensions. This refers to scale C in Fig. 2. The distance 3 to L is cut off, the measurement of the pattern commencing at L referring to the divisions marked "elbow-gathers." For the outside pattern the distance L to 13 measures seven and one-half inches, for the inside pattern five and one half inches, both together making thirteen inches, the measure required.

The scale A, which locates the armseye curves; scale B, which locates the upper end of the side seams, and scale D, which gives the size of cuff, are all arranged upon the same principle, and in order to give a better idea of the method of using these scales I will describe the drafting of two sleeves. (Shown in Figs. 13 and 14.)

Measures taken: Armseye nineteen, inside eight and one-half length thirteen and one-half—twenty-five. Draw base line two inches in from edge of paper; draw two parallel lines at right angles thereto, one and one-fourth inch apart (or to fancy) across the top of the paper; apply measures 1 to 2, thirteen and one-half inches, and to 3 one inch less than measure, or twenty-four inches; square up from 2 and 3. Apply one-half of the armseye measure 1 to 4 and 3 to 5 and draw line 4 to 5; measure down this line three inches to locate point x, and from this point sweep with the tape the line 5 to 6 to form the cuff-line; take the scale indicating the bust-measure of the garment to which the sleeve is to be applied and place division 4 at a and mark end at 6; place 19 of scale (or to fancy) at 6 and mark end at B; place 10 at 1 and mark end at C; place 10 at 1 and mark 5 and end at D and E; place 3 at 4 and mark end at F; place 13 at G and mark end at 7; place 1 at 10, mark end at 11; place 6 at C, mark end at 12; place 3 at 2, mark 1 and end at 8 and 9; sweep C to 12 from *a*; draw F to 11; square down from E; place 12 of scale at E; mark end at H; form 4 to 7 D and C, and F H to 12, as illustrated; form C 8 to 6, also 12 9 to K; form 10 and 11 to B.

Lady's sleeve. Measurements: Armseye, sixteen; length to elbow, thirteen; whole length, twenty-three; around elbow, twelve; around hand for cuff, eight; around upper arm, twelve and one-half. To draft, draw base-line one and one-half inch from edge of the paper; place scale A on base-line and draw line *a* and mark points 1 and 2, using the figures indicating armseye measure; slide scale B to point 1 and draw line 1 and mark points C B and 7; measure from point 1 to 3, length to elbow thirteen inches, and to 4, one inch less than whole length of sleeve, twenty-two inches; slide scale C to 3, draw elbow-line and mark L F and G, using figures indicating elbow-measure; slide scale C to 4 and draw line 4 to 5; draw lines 7 to G and B to F; sweep 5 to 6 with tape and pencil, from point M one inch above elbow-line; place point 6 of scale D at 6, the base-line on base-line; mark D and E, using figures denoting size of cuff; measure with tape 1 to B; with this length-sweep B to 2 from point H; measure C to 7, double the tape and add one-half inch; with this length sweep 7 J to C from point K; draw C to 2 with dart-point; form 2 to L with bottom of dart form; place front neck-point of mode on elbow-line and form G to E, F to D, and L to 6; measure O to P; slide that length to R; hold and ascertain the figures at P; compare with upper arm-measure and mark out or in as the measure shall indicate at R and O, and form T to 7 and M to B, as illustrated by dotted lines.

The point D represents the positive fixed point from which the measures are laid off, and at which the button is placed. It will be observed that in the scales, Figs. 1 and 8, the addition from point B forms no part of the scale, but is simply for the purpose of showing an allowance for seams. This may or may not be used, as desired. The various scales are all on the same base, no calculation being necessary, except to mark the required measure-figure in the proper position, whether for the size of armseye, elbow, or cuff. The result will be the production of the sized pattern required by the measures taken.

In order to provide for the difference between the waist and hip measure, draw lines downward and parallel to the perpendicular sides of the rectangle, at each side of the pattern constituting the waist. Then apply on each line so drawn the measured distance between the bottom waist-line and the point of the greatest hip enlargement, at which point measure at right angles outward such portion of the difference between the waist and hip enlargements as will aggregate or cover the difference between the hip and the waist measures. Now, by drawing a line from the side of each pattern at the bottom of the waist to each enlargement marked I produce a pattern of the proper size to correspond with the bust, waist, and hip measures as taken.

Having thus fully described my invention, what I claim as new, and desire to secure by Letters Patent, is—

1. The method of taking measures and drafting patterns for clothing, which consists in employing a rectangle one side of which is one-half the bust-measure and the other side is the distance between the apparent top bone of the spinal column and the level of the top of the hip-bone, substantially as shown and described.

2. The process of measuring and drafting clothing herein described, consisting in first taking the bust, waist, chest, width of back, length of back, under arm, shoulder, armseye, height of dart, and length of front measures, then making a rectangle one side of which is one-half the largest circumference of the body and the other side the distance between the top bone of the spinal column and the level of the hip-bone, then placing the measurements first taken in position inside of and over the rectangle, then laying off subsidiary lines, determined by means of a scale about one-fourth the bust-measure, and then determining the directions of the several lines by means of eccentric curves, which are placed at the noted measure-points, and using the same as a ruler to delineate the pattern form desired, substantially as described and shown, and for the purpose set forth.

3. The process of measuring and drafting clothing herein described, consisting in first drawing lines downward and parallel with the perpendicular sides of the rectangle at each side of the patterns constituting the waist, then applying on each line so drawn the measured distance between the bottom waist-line and the point of the greatest hip enlargement, then from said point measuring at right angles outward the difference between the hip and waist measures, then drawing a line from the side of each pattern at the bottom of the waist to each enlargement-mark, substantially as shown and described, and for the purpose set forth.

In testimony whereof I affix my signature in presence of two witnesses.

H. AYERS JACKSON.

Witnesses:
CHAS. KRESSMANN,
FRANK JOHNSON.